United States Patent [19]
Joseph et al.

[11] Patent Number: 6,043,524
[45] Date of Patent: *Mar. 28, 2000

[54] TRANSDUCER AND INTERFACE CIRCUIT

[75] Inventors: Eric D. Joseph, Chandler; Barun K. Kar, Tempe, both of Ariz.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/792,843

[22] Filed: Feb. 3, 1997

[51] Int. Cl.[7] .................................................. H01L 29/82
[52] U.S. Cl. ................... 257/254; 257/417; 257/418; 257/420; 73/514.21; 73/514.22; 73/514.23; 73/514.29; 73/514.36; 73/DIG. 1; 438/50; 438/52
[58] Field of Search ..................... 257/417, 254, 257/418, 420; 73/514.21, 514.22, 514.23, 514.29, 514.36, DIG. 1; 438/50, 52

[56] References Cited

U.S. PATENT DOCUMENTS

| | | | |
|---|---|---|---|
| 5,503,017 | 4/1996 | Mizukoshi | 73/514.36 |
| 5,504,356 | 4/1996 | Takeuchi et al. | 257/254 |
| 5,541,437 | 7/1996 | Watanabe et al. | 257/417 |
| 5,572,057 | 11/1996 | Yamamoto et al. | 257/417 |
| 5,578,843 | 11/1996 | Garabedian et al. | 257/254 |
| 5,627,397 | 5/1997 | Kano et al. | 257/417 |

FOREIGN PATENT DOCUMENTS

| | | |
|---|---|---|
| 6207948 | 7/1994 | Japan . |
| 8111535 | 4/1996 | Japan . |

*Primary Examiner*—William Mintel
*Attorney, Agent, or Firm*—Rennie William Dover

[57] ABSTRACT

A sensor (100) includes a fixed gate field-effect transistor (138) that produces a quiescent signal ($V_{QUIESC1}$) in a channel (336) when a control signal ($V_{CONTROL}$) is applied to a source (332) of the FGFET. A movable gate field-effect transistor (MGFET) (108) produces a sense signal ($V_{ACCEL}$) in a channel (316) in response to a physical condition of the sensor when the control signal is applied to a source (312) of the MGFET such that the sense signal is proportional to the quiescent signal. The difference between the currents in the FGFET and MGFET is amplified by a differential amplifier (230) to produce the output signal ($V_{OUT}$) of the sensor. The difference between a reference signal ($V_{RATIO}$) and the quiescent signal is amplified in an amplifier (206) to produce the control signal that adjusts the output signal to be proportional to the reference signal.

14 Claims, 2 Drawing Sheets

TRANSDUCER AND INTERFACE CIRCUIT

CROSS REFERENCE TO RELATED PATENT APPLICATIONS

The present application is related to U.S. patent application Ser. No. 08/523,418, now abandoned, and which has entitled "MONOLITHIC SEMICONDUCTOR DEVICE HAVING A MICROSTRUCTURE AND A TRANSISTOR AND METHOD FOR MANUFACTURE," filed Sep. 5, 1995, by Zhang, et al., "Inventors" and assigned to the same assignee, Motorola Inc. A continuing application having Ser. No. 08/895,171 and claiming priority to U.S. patent application Ser. No. 08/523,418 was filed on Jul. 16, 1997. The continuing application having Ser. No. 08/895,171 issued as U.S. Pat. No. 5,808,331 on Sep. 15, 1998.

BACKGROUND OF THE INVENTION

The present invention relates in general to sensors and, more particularly, to interface circuits for sensors.

Microelectronics technology is presently being used to fabricate mechanical and electromechanical sensors that convert a physical condition to an electrical sense signal. Such sensors are often integrated on a semiconductor substrate with circuit components. For example, where the physical condition is an acceleration, sensing is typically performed by an accelerometer manufactured using micromachining techniques and processing steps similar to those used for fabricating integrated circuits. Accelerometers are used in automobile applications such as collision detectors in air bag systems and as vibration sensors in appliances such as washing machines.

In many applications, the sense signal produced by an accelerometer is coupled to an analog-to-digital converter (ADC) which converts the sense signal to digital data for further processing. Some ADCs have ratiometric inputs, so that the accuracy of the analog-to-digital conversion depends on the sense signal being ratiometric as well. A ratiometric signal is one that is proportional to the power supply voltage. For example, if a sense signal $V=0.5*V_{DD}$, where $V_{DD}$ is a power supply voltage, so that V=2.5 volts when $V_{DD}$=5.0 volts and V=2.0 volts when $V_{DD}$=4.0 volts, then V is ratiometric.

Many prior art accelerometers produce non-ratiometric sense signals. A non-ratiometric accelerometer produces a sense signal having a particular signal level in response to an acceleration independent of power supply voltage. For example, a sensor signal may have a voltage level of V=2.5 volts when $V_{DD}$=5.0 volts or when $V_{DD}$=4.0 volts. Such sensor signals are non-ratiometric. Over a range of power supply voltages, ratiometric signals typically are not equal to non-ratiometric signals.

In converting an incoming sense signal to digital data, an ADC that has a ratiometric input interprets the incoming sense signal as being ratiometric, i.e., as having a ratiometric amplitude, even when the incoming sense signal is non-ratiometric. If the sense signal is non-ratiometric, an error in the digital data which corresponds to the difference between the ratiometric and non-ratiometric amplitudes is generated by the ADC. An error in the sensor signal can have dramatic undesirable consequences especially in safety driven applications such as air bag systems.

Other prior art accelerometers produce a ratiometric sense signal by multiplying a ratiometric reference signal by a non-ratiometric sense signal. The multipliers tend to be overly complex and consume excessive die area.

Hence, there is a need for a ratiometric sensor that does not use multipliers and therefore consumes less die area.

DETAILED DESCRIPTION OF THE DRAWINGS

Figure 1:
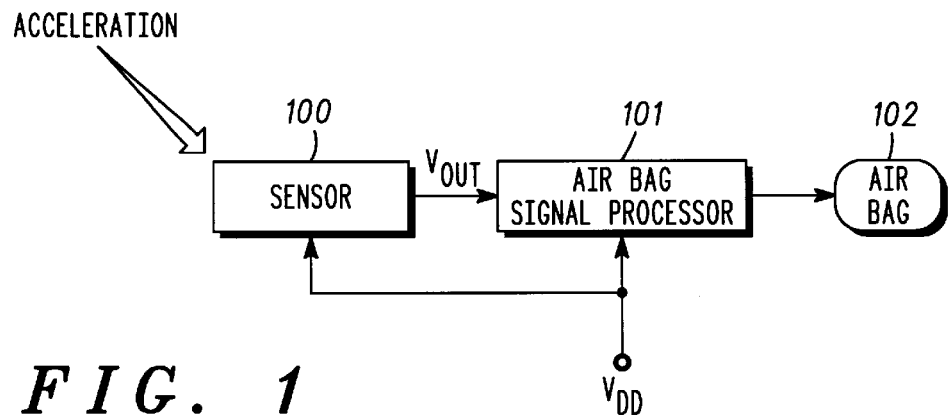
FIG. 1 is a motor vehicle air bag system.

FIG. 1 shows a block diagram of a motor vehicle air bag system including a sensor 100 and an air bag signal processing circuit 101 powered by a power supply voltage $V_{DD}$, and an air bag 102. When a motor vehicle (not shown) is involved in a collision, the motor vehicle is subjected to a physical condition of a rapid change in velocity, or acceleration. The amount of acceleration corresponds to the force of the collision. The acceleration information considered significant in an air bag system has a bandwidth of ten hertz to one kilohertz. Sensor 100 is mounted in the vehicle so as to be subjected to the same acceleration as the vehicle, as shown in FIG. 1, to produce a proportional analog output signal $V_{OUT}$ that drives an input of air bag signal processing circuit 101. $V_{OUT}$ typically is an analog AC signal designed to preserve the bandwidth of the acceleration information, i.e., ten hertz to one kilohertz.

Air bag signal processing circuit 101 includes an analog-to-digital converter (ADC) at the input which converts $V_{OUT}$ to digital data for further processing to compute whether the collision, and thus $V_{OUT}$, is of sufficient magnitude to activate air bag 102. Many ADCs are designed with ratiometric inputs that correctly convert $V_{OUT}$ to digital data when $V_{OUT}$ is ratiometric, or proportional to power supply $V_{DD}$, but which generate an error when $V_{OUT}$ is non-ratiometric. The error can cause the air bag to be activated when there is no collision or, conversely, to fail to activate when there is a collision.

Figure 2:
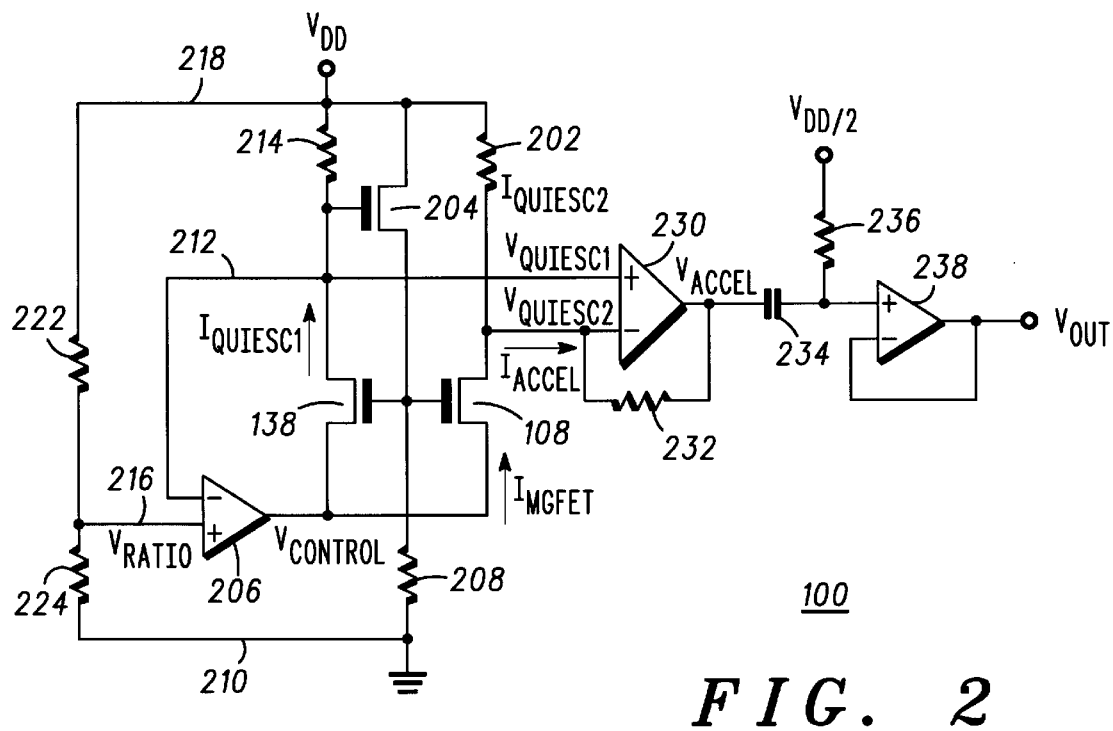
FIG. 2 is a schematic diagram of a sensor.

FIG. 2 is a schematic diagram of a sensor 100 for use as a collision detector in an automobile air bag system. Elements with the same reference number have similar operation. Sensor 100 produces an output signal $V_{OUT}$ in response to acceleration that is ratiometric with respect to power supply voltage $V_{DD}$=5.0 volts.

Sensor 100 includes a movable gate field-effect transistor (MGFET) 108 including a flexible biasing structure that is in motion in the presence of acceleration. The flexible biasing structure is connected to a movable gate that modulates the conduction of MGFET 108 and produces a proportional AC sense current $I_{ACCEL}$ at the drain that retains the acceleration bandwidth of ten hertz to one kilohertz. MGFET 108 is matched to a fixed gate field-effect transistor (FGFET) 138, which includes a rigid biasing structure that is stationary when subjected to the acceleration as discussed in FIG. 3. The rigid biasing structure is connected to a fixed gate of FGFET 138 which is biased to conduct a quiescent drain current $I_{QUIESC1}$. Because of the rigid structure in FGFET 138, the conduction of FGFET 138 is substantially unresponsive to acceleration. The details of MGFET 108 and FGFET 138 are more fully disclosed in conjunction with FIG. 3.

The operation of sensor 100 is first described in the quiescent state. The quiescent state, as used herein, refers to an absence of acceleration. The source and movable gate of MGFET 108 are respectively coupled to the source and fixed gate of FGFET 138. MGFET 108 and FGFET 138 are matched such that MGFET 108 and FGFET 138 have the same electrical operating characteristics. Therefore, drain current $I_{QUIESC1}$ of FGFET 138 matches the drain current $I_{QUIESC2}$ of MGFET 108 in the quiescent state. For example, the operating point of FGFET 138 typically is set such that $I_{QUIESC1}=I_{QUIESC2}=250.0$ microamperes, approximately.

Drain currents $I_{QUIESC1}$ and $I_{QUIESC2}$ are DC currents that flow through matching resistors 214 and 202 to produce equal DC voltages $V_{QUIESC1}$ and $V_{QUIESC2}$ at the drains of MGFET 108 and FGFET 138. Resistors 202 and 214 each typically have a value of ten kilohms. It is understood that MGFET 108 and FGFET 138 can be matched such that MGFET 108 and FGFET 138 produce proportionally scaled drain currents rather than equal drain currents. In such a case, resistors 202 and 214 are typically scaled to the same ratio to maintain equal DC voltage levels at the drains of MGFET 108 and FGFET 138.

Transistor 204 typically comprises a standard field-effect transistor operating as a source follower providing a bias voltage to the movable and fixed gates. Alternatively, transistor 204 and resistor 208 are not used, in which case the fixed gate and drain of FGFET 138 are coupled together in a diode configuration. Resistor 208 is coupled between the source of transistor 204 and a power supply conductor 210 operating at ground potential to produce a bias current for transistor 204.

Resistor 222 and resistor 224 are serially coupled between power supply conductors 210 and 218 to operate as a voltage divider producing a reference voltage $V_{RATIO}$ at node 216 that is proportional to $V_{DD}$ and therefore ratiometric with respect to $V_{DD}$. For maximum symmetric dynamic range, resistor 222 is set equal to resistor 224 so that $V_{RATIO}=V_{DD}/2=2.5$ volts. $V_{RATIO}$ is coupled to a non-inverting input of amplifier 206 and quiescent voltage $V_{QUIESC1}$ is coupled to an inverting input of amplifier 206.

Amplifier 206 amplifies the difference between $V_{QUIESC1}$ and $V_{RATIO}$ and produces control signal $V_{CONTROL}$ at an output. Amplifier 206 operates as a feedback amplifier that controls the current in FGFET 138 to maintain the relationship $V_{QUIESC1}=V_{RATIO}=2.5$ volts. $V_{CONTROL}$ therefore sets the operating point of FGFET 138 to adjust $I_{QUIESC1}$ and $V_{QUIESC1}$ to be ratiometric. Based on the matching of MGFET 108 and FGFET 138, it can be shown that $I_{QUIESC2}$ and $I_{ACCEL}$ are also ratiometric. The gain of amplifier 206 is preferably at least one hundred, which keeps the maximum error in $V_{QUIESC1}$ with respect to $V_{RATIO}$ under one percent.

Amplifier 230 and resistor 232 operate as a gain stage that produces an output voltage $V_{ACCEL}$ that is indicative of an applied acceleration. The drains of FGFET 138 and MGFET 108 are coupled to the non-inverting and inverting inputs of amplifier 230, respectively. Amplifier 230 operates as a feedback amplifier that maintains the drain voltages of FGFET 138 and MGFET 108, i.e., $V_{QUIESC1}$ and $V_{QUIESC2}$, at equal potentials. Due to the matching of MGFET 108 to FGFET 138, the total current $I_{MGFET}$ through MGFET 108 is given by the equation $I_{MGFET}=I_{QUIESC2}$ and no current flows through resistor 232 such that $V_{QUIESC2}=V_{QUIESC1}$.

The operation of sensor 100 relies on matching or scaling of the electrical operation of MGFET 108 and FGFET 138, which are inherently dissimilar, at least with respect to their responses to acceleration. Without such matching, control over the conduction of MGFET 108 becomes highly impractical.

Figure 3:
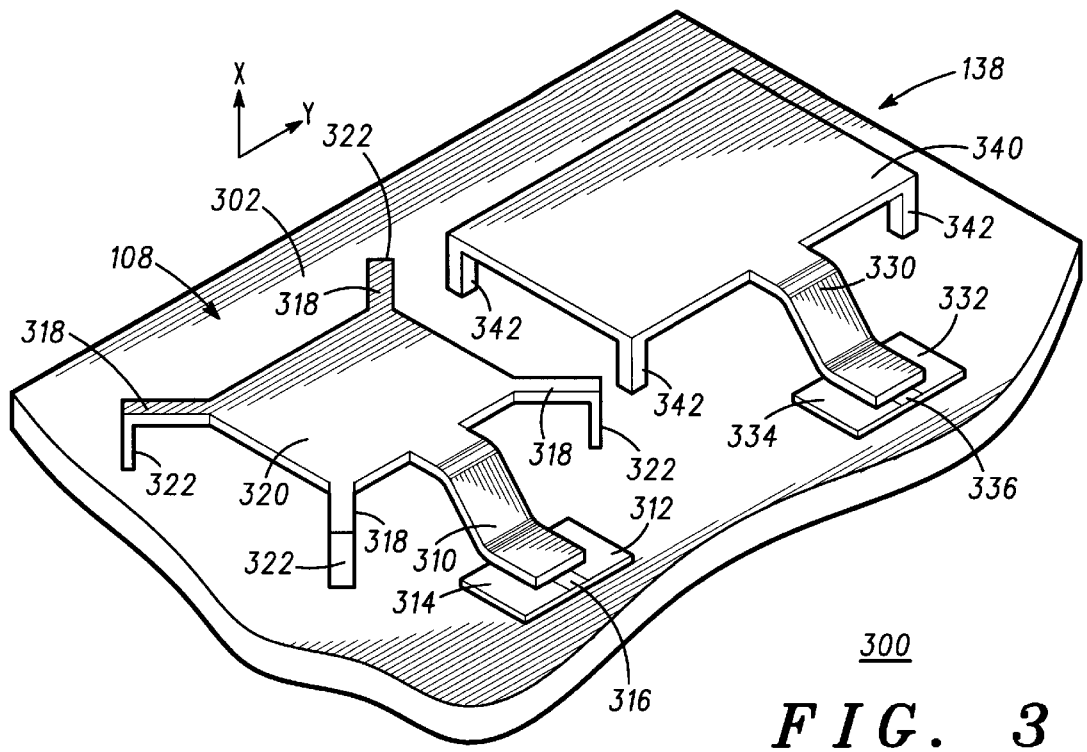
FIG. 3 is an isometric view of a sensing structure.

Referring to FIG. 3, an isometric view is shown of a sensing structure 300 for operation as an accelerometer, including a MGFET 108 and a FGFET 138 formed on a substrate 302. MGFET 108 includes a flexible biasing structure including a plurality of cantilevered beams 318, a plate 320 and a plurality of columns 322. MGFET 108 further includes a movable gate 310 connected to plate 320, and a source 312, a drain 314 and a channel 316 formed in substrate 302. FGFET 138 includes a rigid biasing structure including a plurality of columns 342 and a plate 340. FGFET 138 further includes a fixed gate 330 connected to plate 340 and a source 332, a drain 334 and a channel 336 formed in substrate 302. Plate 340 is supported by columns 342 and remains rigid, i.e. is not displaced, under acceleration.

Columns 322 of MGFET 108 are formed or disposed on substrate 302 to support cantilevered beams 318 for suspending plate 320 above the surface of substrate 302. Columns 322 are formed to a height, e.g., 1.0 micrometers, sufficient to ensure that under worst case operating conditions plate 320 and movable gate 310 do not contact substrate 302. Columns 322 typically have a high spring constant so as to be substantially rigid.

In contrast, cantilevered beams 318 are relatively longer, e.g., 90.0 micrometers, to provide a low spring constant that allows cantilevered beams 318 to flex under acceleration such that plate 320 and movable gate 310 are displaced linearly. Cantilevered beams are oriented such that plate 320 is readily displaced vertically, i.e., toward or away from substrate 302. However, the displacement of plate 320 in a direction parallel to the surface of substrate 302 is substantially zero. It is understood that alternate arrangements are known for configuring cantilevered beams to have different displacement characteristics along other axes. The principles of the present invention equally apply to such configurations. Therefore, operation of sensing structure 300 is described assuming vertical acceleration.

Movable gate 310 projects from plate 320 in suspension over channel 316, which is formed in substrate 302. Movable gate 310 is shown tapering down toward substrate 302 to overlie channel 316 at a lower height to increase the effective gate capacitance of MGFET 108 that is formed between movable gate 310 and channel 316. The tapering brings movable gate 310 closer to channel 316 to increase the effective gate capacitance and transconductance gain of MGFET 108 while minimizing the flatness requirement of plate 320. Alternatively, movable gate 310 is formed to project out from plate 320 at the same height as plate 320 with a corresponding reduction in gain. Movable gate 310 is typically formed from a conductive material such as doped polysilicon.

Channel 316 provides an electrical conduction path from source 312 to drain 314 whose conductivity is a function of the bias voltage of movable gate 310. Conductivity is also modulated as movable gate 310 is displaced by the flexible biasing structure under acceleration. Channel 316 is typically doped to have the same conductivity type as source 312 and drain 314 for operation as a depletion mode device. For example, where substrate 302 has p-type conductivity, MGFET 108 is configured to operate as a n-channel depletion mode device with source 312, drain 314 and channel 316 doped to n-type conductivity. The present invention is not limited to the above doping configuration but is equally applicable when MGFET 108 has an alternative doping arrangement such as p-channel or enhancement mode doping.

A protective dielectric layer (not shown) is typically formed over channel 316 to reduce or eliminate contamination, while still leaving an air gap between movable gate 310 and the dielectric layer. In one embodiment, a silicon dioxide/silicon nitride dielectric layer is used to protect channel 316 with an air gap of approximately 2,000 Angstroms. However, because a gate electrode is not formed on the surface of the dielectric layer, as with conventional field-effect transistors, the variation in surface charges of channel 316 over time results in the conduction of channel 316 being susceptible to long term drift.

FGFET 138 and MGFET 108 are typically formed using standard semiconductor and micromachining processes. FGFET 138 is fabricated such that in a quiescent state the electrical operation of MGFET 108 matches the electrical operation of FGFET 138. More particularly, columns 342, plate 340, source 332, drain 334, channel 336 and fixed gate 330 of FGFET 138 are formed or disposed on substrate 302 using the same fabrication steps as those used in forming columns 322, plate 320, source 312, drain 314, channel 316 and movable gate 310 of MGFET 108, respectively. Channel 336 therefore provides an electrical conduction path from source 332 to drain 334 whose conductivity is a function of the bias voltage of fixed gate 330. As a result, the gate capacitance of MGFET 108 is equal to the gate capacitance of FGFET 138 and the quiescent electrical characteristics of channels 316 and 336 of MGFET 108 and FGFET 138 are the same.

FGFET 138 does not include cantilevered beams, so the structure formed with columns 342 and plate 340 is substantially rigid, whereas cantilevered beams 318 render the structure of MGFET 108 flexible. Because FGFET 138 is rigid, fixed gate 330 is stationary under acceleration so that the conduction in channel 336 does not change. In contrast, movable gate 310 undergoes a displacement in the presence of acceleration that modulates the conduction of channel 316. Channel 336 is protected by a similar dielectric layer as channel 316, so the conduction of both FGFET 138 and MGFET 108 are subject to long term drift.

MGFET 108 and FGFET 138 therefore have matching electrical conduction paths and electrical characteristics but inherently different responses to a physical condition such as acceleration. FGFET 138 is preferably operated with zero volts between fixed gate 330 and channel 336 in order to minimize the electrostatic force between fixed gate 330 and channel 336 that causes a small yet undesirable displacement of fixed gate 330. Similarly, MGFET 108 is preferably operated with zero volts between movable gate 310 and channel 316 in order to minimize the electrostatic force between movable gate 310 and channel 316 that causes a larger displacement of movable gate 310 due to the flexible structure of MGFET 108. Such electrostatic forces result in a mismatch in the electrical characteristics of MGFET 108 and FGFET 138. Therefore, MGFET 108 preferably is fabricated to have a conduction threshold of movable gate 310 with respect to source 312 of zero volts. For the same reason, FGFET 138 is preferably fabricated to have a conduction threshold of fixed gate 330 with respect to source 332 of zero volts. Electrostatic forces are further reduced by operating MGFET 108 and FGFET 138 with a voltage from source to drain as nearly equal to zero volts as is practicable.

Referring back to FIG. 2, operation of sensor 100 is described under acceleration. When a vehicle is in a collision, an acceleration results which causes MGFET 108 to undergo a displacement that induces an AC drain current $I_{ACCEL}$ proportional to the acceleration. Therefore, under acceleration the total current $I_{MGFET}$ in MGFET 108 is given by the equation $I_{MGFET} = I_{QUIESC2} + I_{ACCEL}$. FGFET 138 is substantially unresponsive to acceleration, so that a comparable AC signal is not produced at the drain of FGFET 138. $V_{CONTROL}$ is derived from the drain of FGFET 138 and therefore is not affected by acceleration. The magnitude of $I_{ACCEL}$ is determined by the operating point of MGFET 108. Therefore, $I_{ACCEL}$ is proportional to $I_{QUIESC2} = I_{QUIESC1}$.

Differential amplifier 230 and feedback resistor 232 operate as a closed loop transconductance gain stage that converts the difference between $I_{QUIESC1}$ and $I_{MGFET}$, i.e., $I_{ACCEL}$, to output voltage $V_{ACCEL}$, which is further processed to provide the sensor output signal $V_{OUT}$. The feedback provided by resistor 232 maintains the relationship $V_{QUIESC1} = V_{QUIESC2}$. Recall that $V_{QUIESC1}$ is a DC voltage. Therefore, $V_{QUIESC2}$ is maintained as a DC voltage. As a result of the operation of the feedback loop in maintaining the drain voltages of FGFET 138 and MGFET 108 at the same potential, the output of amplifier 230 is driven to a voltage level of $V_{ACCEL}$ that is sufficient to force $I_{ACCEL}$ to flow through resistor 232. The AC component of $V_{ACCEL}$ is thereby set to a value equal to the product of $I_{ACCEL}$ and resistor 232. For example, where $I_{ACCEL} = 1.0$ microampere and resistor 232 is one megohm, the AC output voltage of amplifier 230 is 1.0 volt.

$V_{ACCEL}$ is ratiometric because $I_{ACCEL}$ is ratiometric. Amplifier 230 preferably has a high open loop gain of at least $10^4$ in order to minimize the loop error and the resulting error current flowing through resistor 232. The quiescent output of amplifier 230 is equal to $V_{QUIESC1} = V_{DD}/2 = 2.5$ volts.

The long term drift described previously results in the output signal of amplifier 230 changing over time from the nominal value of $V_{DD}/2$. Long term drift is an essentially DC effect, having a frequency component well below one hertz. A differentiator or high pass filter comprising capacitor 234 and resistor 236 is used to attenuate low frequency drift-related components while passing higher frequency collision information contained in $V_{ACCEL}$ without attenuation. Therefore, the corner frequency of the differentiator is typically set to be less than one hertz. Resistor 236 is referenced to a stable ratiometric voltage of $V_{DD}/2$ for maximum dynamic range. Amplifier 238 operates as a standard unity gain output buffer. The ratiometric nature of $V_{ACCEL}$ is preserved, so that output signal $V_{OUT}$ is also ratiometric with the long term drift effects removed.

Figure 4:
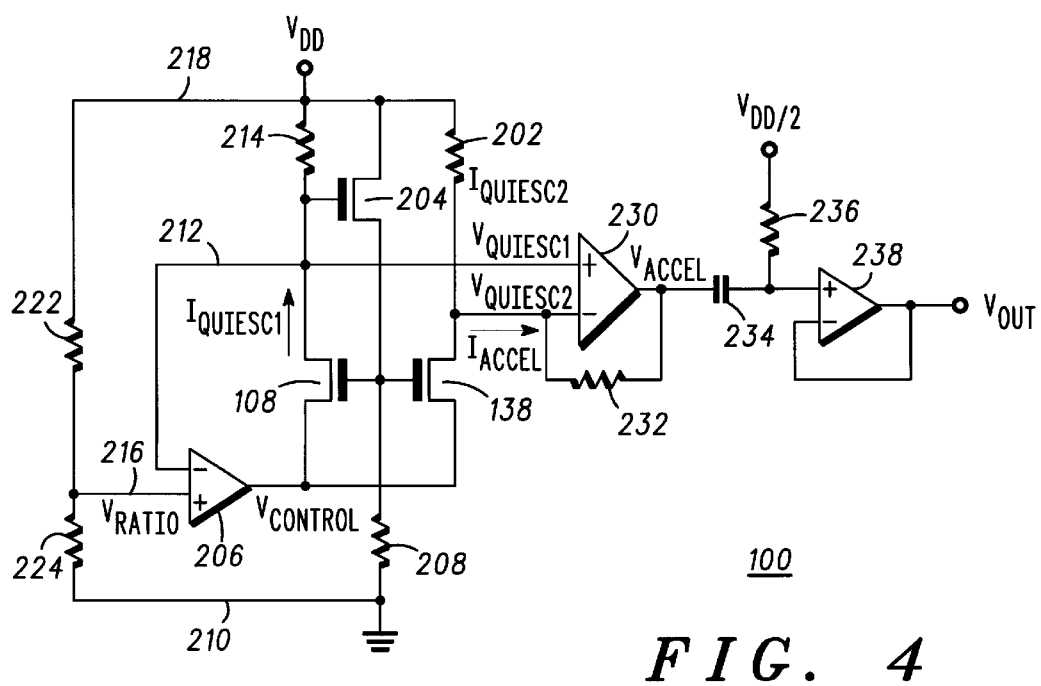
FIG. 4 is a schematic diagram of an alternate embodiment of the sensor.

FIG. 4 shows an alternative embodiment of a sensor 100. Elements having the same reference number have similar operation and connectivity as corresponding elements in FIG. 2, except that MGFET 108 and FGFET 138 are interchanged. As a result, sensor 100 produces an output signal $V_{OUT}$ having the opposite polarity.

By now it should be appreciated that the present invention provides a circuit and method for producing a sense signal responsive to a physical condition that can be made ratiometric with respect to a power supply voltage. A control signal applied to an input of a FGFET that includes a rigid sensing structure that is stationary under acceleration. The FGFET produces a quiescent signal in a channel of the FGFET that is unresponsive to acceleration. The control signal is applied to an input of a MGFET, a flexible structure operating as a transducer, for producing a quiescent current in the MGFET that is equal to the quiescent signal of the FGFET. In the presence of acceleration, a sense signal is produced in a channel of the MGFET that is proportional to the quiescent signal. The difference between a ratiometric reference signal and the quiescent signal is amplified in a feedback amplifier to produce the control signal to adjust the amplitude of the sense signal to be ratiometric.

What is claimed is:

1. A sensor, comprising:
   a first structure that is stationary in response to a physical condition;
   a first electrical conduction path controlled by the first structure for conducting a first signal;
   a second structure that is in motion in response to the physical condition;
   a second electrical conduction path that is modulated by the second structure to conduct a second signal such that a difference between the first signal and the second signal provides a sense signal of the sensor representative of the physical condition; and
   a first differential amplifier having a first input coupled for receiving the first signal, a second input coupled for receiving the second signal, and an output for providing the sense signal.

2. The sensor of claim 1, further comprising a feedback circuit coupled between the output of the first differential amplifier and the second input of the first differential amplifier.

3. The sensor of claim 2, further comprising:
   a high-pass filter having an input coupled to the output of the first differential amplifier; and
   a buffer amplifier coupled to an output of the high-pass filter for providing the sense signal of the sensor.

4. The sensor of claim 1, further comprising a second differential amplifier having a first input coupled for receiving the first signal, a second input coupled for receiving a reference signal, and an output for providing a control signal to the first and second electrical conduction paths.

5. The sensor of claim 4, wherein the first electrical conduction path includes a first transistor having a first conduction terminal coupled for receiving the control signal, a second conduction terminal for providing the first signal, and a control terminal connected to the first structure.

6. The sensor of claim 5, wherein the second electrical conduction path includes a second transistor having a first conduction terminal coupled for receiving the control signal, a second conduction terminal for providing the second signal, and a control terminal connected to the second structure.

7. The sensor of claim 1, further comprising a second differential amplifier having a first input coupled for receiving the second signal, a second input coupled for receiving a reference signal, and an output for providing a control signal to the first and second electrical conduction paths.

8. The sensor of claim 7, wherein the first electrical conduction path includes a first transistor having a first conduction terminal coupled for receiving the control signal, a second conduction terminal for providing the first signal, and a control terminal connected to the first structure.

9. The sensor of claim 8, wherein the second electrical conduction path includes a second transistor having a first conduction terminal coupled for receiving the control signal, a second conduction terminal for providing the second signal, and a control terminal connected to the second structure.

10. The sensor of claim 1 wherein the physical condition is acceleration.

11. The sensor of claim 1 wherein the first signal in the first electrical conduction path is proportional to a power supply voltage.

12. The sensor of claim 2, wherein the first structure is a fixed gate field-effect transistor.

13. The sensor of claim 12, wherein the second structure is a movable gate field-effect transistor.

14. The sensor of claim 2, wherein the second structure is a movable gate field-effect transistor.

* * * * *